United States Patent [19]
Witkovsky

[11] Patent Number: 5,456,494
[45] Date of Patent: Oct. 10, 1995

[54] SECURING ARRANGEMENT FOR ABSORBING KNEE-IMPACT FORCES

[75] Inventor: Thomas Witkovsky, Grafenau, Germany

[73] Assignee: Mercedes-Benz AG, Stuttgart, Germany

[21] Appl. No.: 266,531

[22] Filed: Jun. 27, 1994

[30] Foreign Application Priority Data

Jun. 26, 1993 [DE] Germany .......................... 43 21 302.2

[51] Int. Cl.$^6$ ................................................. B60R 21/045
[52] U.S. Cl. ............................ 280/752; 296/72; 296/189; 188/377
[58] Field of Search ........................ 280/752, 751; 180/90; 296/70, 72, 74, 189, 194; 188/371, 377

[56] References Cited

U.S. PATENT DOCUMENTS

| | | | |
|---|---|---|---|
| 4,372,412 | 2/1983 | Fujii et al. | 180/90 |
| 4,709,943 | 12/1987 | Yoshimura et al. | 280/752 |
| 4,949,990 | 8/1990 | Hirhara et al. | 280/752 |
| 4,978,136 | 12/1990 | Tomita et al. | 280/752 |
| 5,037,130 | 8/1991 | Okuyama | 280/752 |
| 5,096,223 | 3/1992 | Tekelly | 280/752 |
| 5,238,286 | 8/1993 | Tanaka et al. | 280/752 |
| 5,273,314 | 12/1993 | Sakakibara | 280/752 |

FOREIGN PATENT DOCUMENTS

| | | |
|---|---|---|
| 4003952 | 8/1991 | Germany . |
| 5085289 | 4/1993 | Japan ..................................... 280/752 |
| 5213128 | 8/1993 | Japan ..................................... 280/752 |

*Primary Examiner*—Margaret A. Focarino
*Assistant Examiner*—Peter C. English
*Attorney, Agent, or Firm*—Evenson McKeown Edwards & Lenahan

[57] ABSTRACT

A knee impact absorption assembly for passenger vehicles is disclosed. Two supporting parts are arranged such that they are spaced apart laterally from one another and are connected to a transverse carrier extending in the transverse direction of the vehicle and fixed to the vehicle. A high degree of energy absorption is achieved in the case of a slight displacement of knee impact parts of an instrument panel carrying part or dashboard by providing that the transverse carrier with the supporting parts extend above points in which the knee of the occupant makes impact and each supporting part has a hook-shaped configuration. The supporting parts include struts which are directed such that they are angled off laterally upwards from a web connecting to the instrument panel carrying part or dashboard. The struts are provided with an angle cross-section, project at a distance from one another and are fixed on the transverse carrier by means of their free ends. The struts are configured to absorb knee impact forces by deformably moving both in a vehicle longitudinal direction and in a transverse direction with respect to each other.

5 Claims, 4 Drawing Sheets

5,456,494

SECURING ARRANGEMENT FOR ABSORBING KNEE-IMPACT FORCES

BACKGROUND AND SUMMARY OF THE INVENTION

The invention relates to a securing arrangement for absorbing forces which are caused by knee impact on the front-passenger side of a motor car. These forces are introduced into an instrument panel, and the securing arrangement comprises two supporting parts which are arranged such that they are spaced apart laterally from one another and are positioned in front of a transverse carrier. The transverse carrier extends in the transverse direction of the vehicle and is fixed to the vehicle. The supporting parts are connected to the carrier. The transverse carrier is provided with the supporting parts running above points at which the knee of the occupant makes impact, and each supporting part is configured as a strut which has a profiled cross-section, which has a hook-shaped configuration facing the direction of impact and which moves rearwards in the event of impact loading, absorbing energy in the process.

An instrument panel which is supported in this manner on the front-passenger side is disclosed in U.S. Pat. No. 4,978, 136. In this arrangement, each strut is supported near the point of impact on a part which is fixed to the vehicle, via a carrying part extending in the transverse direction of the vehicle, with the result that the carrying part is deformed in the event of impact, and forces the strut to undergo a predetermined deformation action, which is manifested by a distortion of the strut.

A further dashboard securing means can be obtained from FIG. 1 of the drawing and constitutes a prior art for which documentary evidence is not available. The two supporting parts are arranged at the level of impact and are positioned directly in front of the transverse carrier, which is connected, via carrying parts, to a further transverse carrier, running at a higher level and extending over the entire width of the vehicle, and, owing to their configuration, are not capable, in the event of impact loading, of noticeable deformation, absorbing energy in the process.

An object of the invention is to configure and support the securing arrangement such that, in the event of only a slight rearwards displacement of the supporting parts caused by impact, the supporting parts are capable of producing a high degree of energy absorption.

This object is achieved, in the case of a securing arrangement of the type referred to above by an arrangement wherein the supporting parts are configured and connected so they deform in the longitudinal direction of the vehicle and also laterally with respect to one another.

It is already known, from German Patent Document DE 40 03 952 A1, to support a knee-cushioning means, arranged beneath a dashboard, via energy-absorbing retaining means, the latter being compressed. However, owing to the components, such as the air-channeling ducts, cable runs and the dashboard support framework, which are amassed behind the dashboard right in the knee-impact region, hardly any deformation path for bringing about the deformation procedure in the impact direction is available.

The proposal according to the invention remedies this above noted problem in that, in the event of a rearwards (forward in vehicle travel direction) displacement of the supporting parts caused by impact, the struts, owing to the configuration of the supporting parts, not only bulge out towards the rear, but also laterally, absorbing energy in the process. Depending on the position of the impact, the bulgings may be directed towards one another or away from one another. If impact takes place above the fastening point of the web of the supporting parts, then the struts, in addition to moving towards the rear, also move outwards, while in the event of impact beneath the fastening point, the struts move laterally towards one another.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
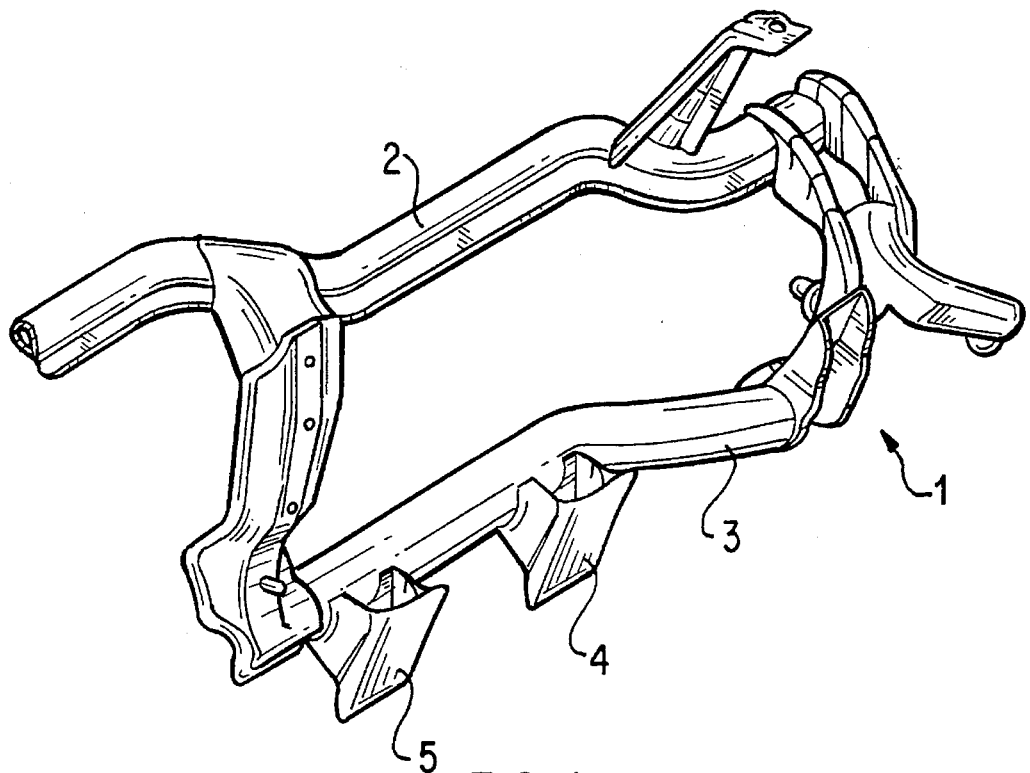
FIG. 1 is a perspective schematic view which shows a prior art front-passenger-side securing arrangement without the dashboard supported by it.
Figure 2:
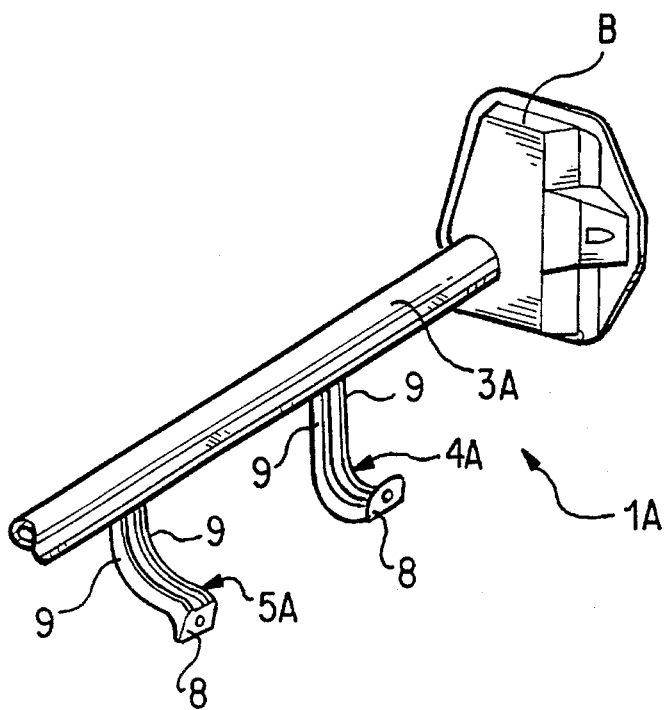
FIG. 2 is a perspective schematic view which shows a securing arrangement comparable to FIG. 1, but constructed with supporting parts constructed according to preferred embodiments of the present invention.

In the case of the securing means 1, representing the prior art, according to FIG. 1, a top transverse carrier 2, extends over the entire width of the vehicle in a manner which is not shown. The carrier 2 is assigned a bottom transverse carrier 3 which is connected thereto as well as to two spaced-apart supporting parts 4 and 5 which are used, in a manner which is not shown, for fixing the front-passenger-side knee region of a dashboard. In this arrangement, the transverse carrier 3 is located at the level of the impact of the knee of a front passenger.

Figure 3:
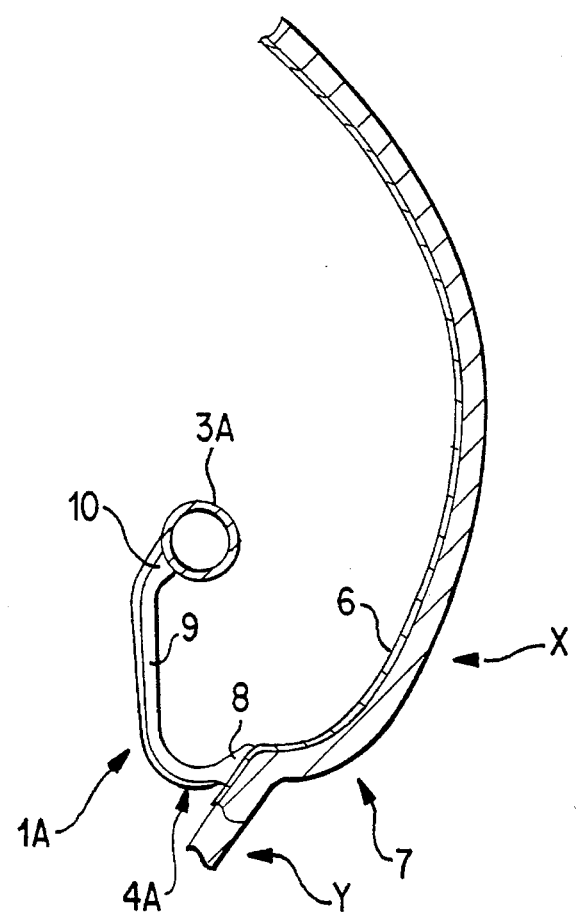
FIG. 3 is a sectional simplified schematic view which shows the fixing of the dashboard on the outer supporting part of the arrangement of FIG. 2.
Figure 4:
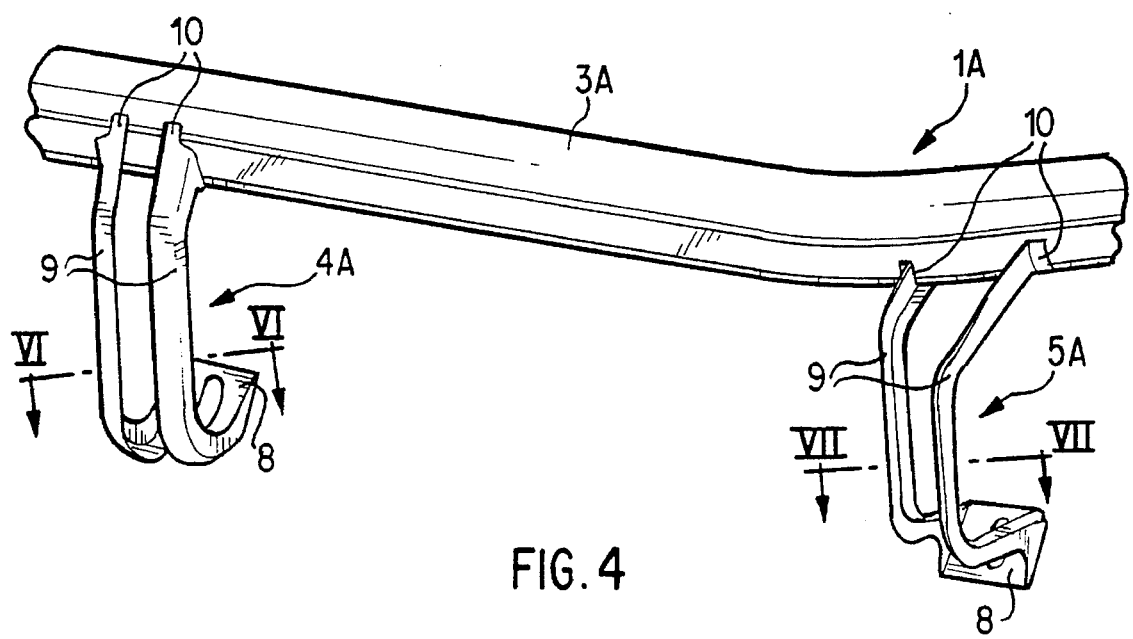
FIG. 4 is a schematic perspective view which shows the two supporting parts, received by the transverse carrier, counter to the direction in which impact takes place of the arrangement of FIG. 2.

In the case of the securing arrangement 1A of FIGS. 2 to 7, according to the invention, only one tubular transverse carrier 3A is provided which extends in a manner which is not shown over the entire width of the vehicle. Transverse carrier 3A is fixed on its end sides to the vehicle bodywork B (FIG. 2) and is located, with respect to the known configuration according to FIG. 1, at a level between the two transverse carriers (2 and 3 of FIG. 1) and thus above the position of impact of the knee of a front passenger. The supporting parts 4A and 5A have a web 8 which serves to fasten the carrying part 6 of an instrument panel or dashboard 7 (FIG. 3). The supporting parts 4A, 5A include cross-sectionally angle-formed struts 9 projecting from transverse carrier 3A at a distance from one another and directed such that they are angled off laterally. The struts 9 are welded on the transverse carrier 3A by means of their free ends 10.

The supporting parts 4A and 5A are configured as folding parts, which, due to a bending position, are forced to have a hook-shaped configuration. In the case of the supporting part 4A, the web 8 is positioned in an upright manner with respect to the struts 9 which are directed with their angle profile, towards the dashboard 7. In the case of the supporting part 5A in which the angle profile is directed away from the dashboard 7, the web 8 is angled off downwards.

Figure 5:
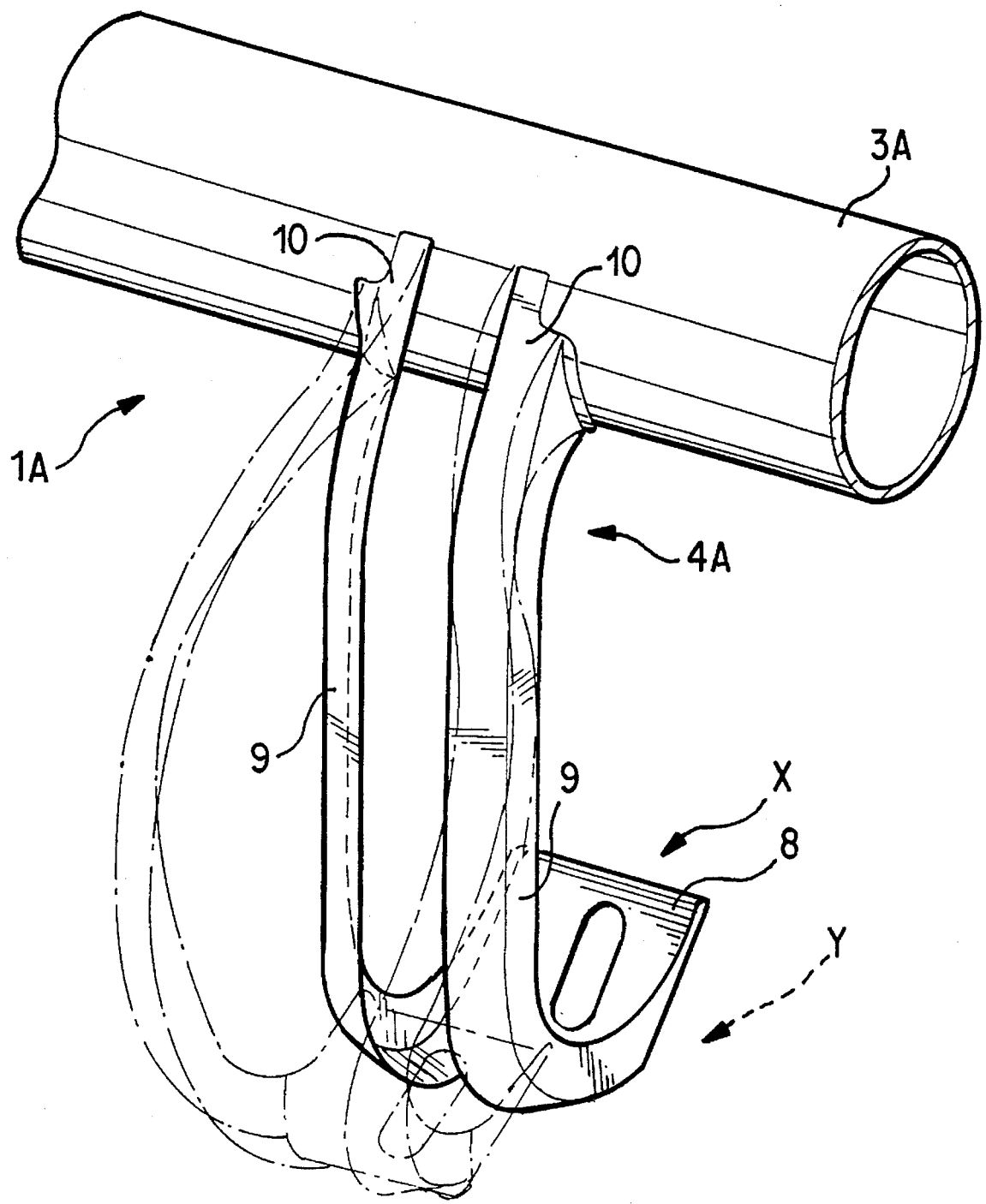
FIG. 5 is an enlarged perspective view of the outer supporting part of FIG. 4 with a non-deformed initial position, shown in solid lines, and with a position which is deformed as a result of a force X acting on the supporting part.
Figure 6:
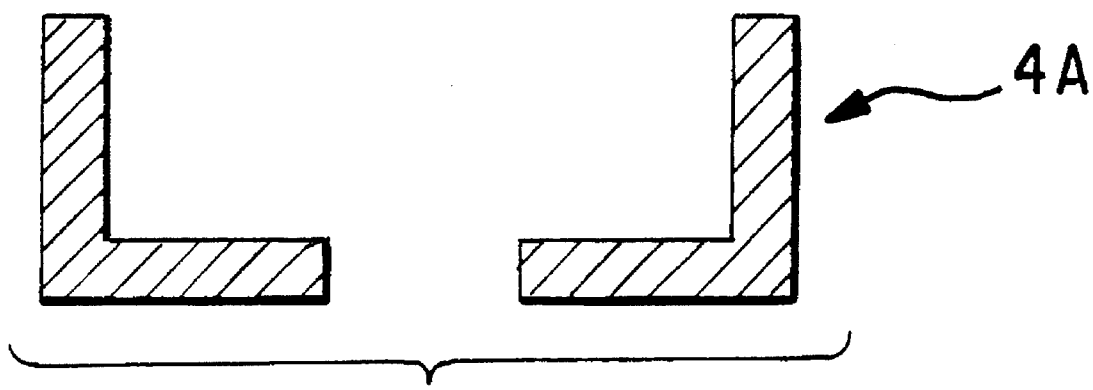
FIG. 6 is a schematic sectional view along line VI—VI of FIG. 4.
Figure 7:
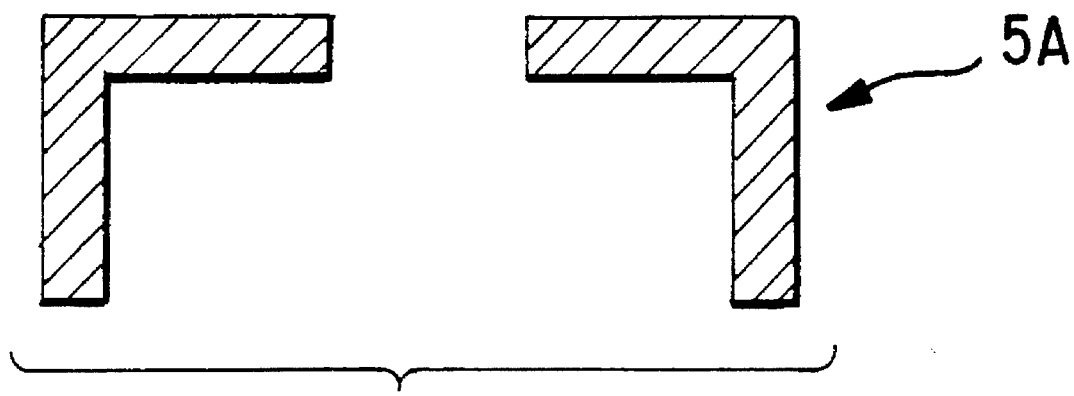
FIG. 7 is a schematic sectional view along line VII—VII of FIG. 4.

If knee impact causes force to be introduced in the direction of the arrow X in FIG. 5, which extends above the fastening point of the web 8 on the carrying part 6 (not shown) of the instrument panel 7, then, when a given force is exceeded, the web 8 along with the two struts 9, absorbing energy in the process, are transferred out of the structure position shown in solid lines into the deformation position shown in chain-dotted lines, in the case of which, during the rearwards displacement of the struts 9 (forward in vehicle direction), the struts 9 also move laterally outwards with respect to one another. This results in the fact that, despite a comparatively slight rearwards displacement, a degree of energy absorption which corresponds to available requirements takes place. Thus, space for installing other parts in the region of the carrier 3A and dashboard 7 is available while still providing optimal deformation absorption of knee collision forces against the dashboard.

If, in contrast, the forces are introduced in the direction of the arrow Y, which is provided beneath the fastening point of the web 8 on the carrying part 6 of the instrument panel 7, tests have shown, in practice, that, during the rearwards displacement (toward the carrier 3A) of the web 8 and of the struts 9, the latter are bent towards one another, which, owing to the distance between the struts 9 which is inherent in the design, can take place with the absorption of energy.

In the illustrated embodiment, the profile of the two struts 9 of supporting parts 4A and 5A have different cross-sections (FIGS. 6 and 7) to accommodate disposition of adjacent parts. Other embodiments with generally similar cross-sections for both struts are contemplated, provided the attachment of the webs 8 and orientation of the struts assure the transverse and longitudinal deformation movement.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Knee impact absorption assembly for motor vehicles comprising:

a vehicle dashboard panel located in front of a vehicle passenger space, said dashboard panel extending at a knee level of passengers seated in the passenger space, a transverse carrier extending transversely of a vehicle at a position located forwardly of and spaced from the dashboard panel, said transverse carrier being fixedly attached to the vehicle, and two profiled cross-section struts connected to and extending downwardly and rearwardly from the transverse carrier in an hook-shaped manner, said struts each including a connecting web attaching the strut to said dashboard panel, said struts serving to support the dashboard panel with respect to the carrier and to cushion knee impact forces against the dashboard panel by deformation movement of the struts with respect to the carrier in the event of a vehicle collision caused impact of a passenger's knees against a dashboard panel carrying part, wherein said struts include means for assuring a predetermined deformation movement of the struts in both a forward vehicle direction and a transverse direction with respect to one another in response to knee impact forces against the dashboard panel.

2. Knee impact absorption assembly according to claim 1, wherein said struts include means for causing said struts to move transversely toward one another in response to knee impact forces against the dashboard panel at a first vehicle height and to move transversely away from one another in response to knee impact forces against the dashboard panel at a second vehicle height.

3. Knee impact absorption assembly according to claim 2, wherein said first vehicle height is below said second vehicle height.

4. Knee impact absorption assembly according to claim 3, wherein said first vehicle height is below a location where said webs are attached to the dashboard panel.

5. Knee impact absorption assembly according to claim 4, wherein said second vehicle height is above the location where said webs are attached to the dashboard panel.

* * * * *